(12) United States Patent
Bhat et al.

(10) Patent No.: US 10,019,337 B2
(45) Date of Patent: Jul. 10, 2018

(54) CLASS OBJECT HANDLE TRACKING

(71) Applicant: Mentor Graphics Corporation, Wilsonville, OR (US)

(72) Inventors: Vivek Bhat, San Jose, CA (US); Richard Edelman, San Jose, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 30 days.

(21) Appl. No.: 15/006,289

(22) Filed: Jan. 26, 2016

(65) Prior Publication Data
US 2016/0232084 A1    Aug. 11, 2016

Related U.S. Application Data

(60) Provisional application No. 62/113,818, filed on Feb. 9, 2015.

(51) Int. Cl.
| | |
|---|---|
| *G06F 9/44* | (2018.01) |
| *G06F 11/34* | (2006.01) |
| *G06F 11/36* | (2006.01) |

(52) U.S. Cl.
CPC ...... *G06F 11/3476* (2013.01); *G06F 11/3419* (2013.01); *G06F 11/3624* (2013.01); *G06F 11/3664* (2013.01); *G06F 11/3409* (2013.01); *G06F 11/3466* (2013.01)

(58) Field of Classification Search
CPC ....................................... G06F 11/30–11/3696
See application file for complete search history.

(56) References Cited

U.S. PATENT DOCUMENTS

| | | | | |
|---|---|---|---|---|
| 8,930,912 | B2* | 1/2015 | Andrews | G06F 11/3688 |
| | | | | 717/126 |
| 9,081,924 | B2* | 7/2015 | Chen | G06F 11/3672 |
| 9,575,864 | B2* | 2/2017 | Chau | G06F 11/3409 |

(Continued)

OTHER PUBLICATIONS da Silva, Karina R. et al., "An Automatic Testbench Generation Tool for a SystemC Functional Verification Methodology," 2004, pp. 66-70.*

(Continued)

*Primary Examiner* — Thuy Dao
*Assistant Examiner* — Christopher J Franco
(74) *Attorney, Agent, or Firm* — Mentor Graphics Corporation

(57) ABSTRACT

This application discloses a computing system to identify portions of source code in a test bench that correspond to class objects, and insert handle tracking code at locations in the test bench associated with the identified portions of source code. During simulation of the test bench, the computing system can execute the handle tracking code, which generates handle occupancies corresponding to memory pointers associated with the class objects. Each of the handle occupancies can include a handle reference or memory pointer for a class object, a location in the test bench corresponding to usage of the memory pointer, and a simulation time associated with the generation of the handle occupancy. The computing system can arrange the handle occupancies, synchronize the handle occupancies to portions of source code in the test bench, and display the handle occupancies and the test bench source code in a debug window.

15 Claims, 6 Drawing Sheets

(56) References Cited

U.S. PATENT DOCUMENTS

| | | | | |
|---|---|---|---|---|
| 2006/0101406 A1* | 5/2006 | Goenka | ............... | G06F 11/3664 |
| | | | | 717/124 |
| 2010/0153924 A1* | 6/2010 | Andrews | ............. | G06F 11/3688 |
| | | | | 717/126 |
| 2011/0238397 A1* | 9/2011 | Chen | ................... | G06F 11/3672 |
| | | | | 703/13 |
| 2013/0152053 A1* | 6/2013 | Cui | ..................... | G06F 11/3672 |
| | | | | 717/127 |
| 2015/0347263 A1* | 12/2015 | Chau | ................... | G06F 11/3409 |
| | | | | 717/130 |

OTHER PUBLICATIONS

Bajracharya, Sushil et al., "Sourcerer—A Search Engine for Open Source Code Supporting Structure-Based Search," 2006, pp. 681-682.*
Schutz, Markus, "How to Efficiently Build VHDL Testbenches," 1995, pp. 554-559.*
Slade, Anthony L., "Reconfigurable Computing Application Frameworks," 2003, pp. 1-10.*
Lajolo, M. et al., "Automatic Test Bench Generation for Simulation-based Validation," 2000, pp. 136-140.*
Walkinshaw, Neil et al., "Understanding object-oriented source code from the behavioural perspective," 2005, pp. 1-10.*

* cited by examiner

CLASS OBJECT HANDLE TRACKING

RELATED APPLICATION

This application claims benefit of and priority to U.S. Provisional Patent Application No. 62/113,818, filed Feb. 9, 2015, which is incorporated by reference herein.

TECHNICAL FIELD

This application is generally related to electronic design automation and, more specifically, to tracking handles or memory pointers during verification for use in a debugging environment.

BACKGROUND

Electronic systems are used in a variety of products, from automobiles to microwaves to personal computers. Designing and fabricating these electronic system typically involves many steps, known as a "design flow." The particular steps of a design flow often are dependent upon the type of electronic system, its complexity, the design team, and the electronic system fabricator or foundry that will manufacture the electronic system. Typically, software and hardware "tools" verify the design at various stages of the design flow by running software simulators and/or hardware emulators, and errors in the design are corrected or the design is otherwise improved.

Several steps are common to most design flows for electronic system. Initially, the specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

Functional verification typically begins with a circuit design coded at the register transfer level, which can be simulated by a design verification tool. A designer can generate a test bench that, when simulated with the circuit design, can allow the design verification tool to analyze the functionality of the simulated circuit design. When the simulated circuit design operates differently than expected in response to stimulus from the test bench, the designer can attempt to debug the circuit design, for example, to determine which of the gates in the circuit design is incorrectly configured, resulting in the generation of illegal states or transitions.

The design verification tool can record signal states and transitions of the circuit design, often called waveform data, which the designer can review in an attempt to identify a "bug" in the circuit design. The designer typically can utilize a debug tool to review the recorded waveforms, often alongside a source code of the circuit design, in an attempt to locate and address the circuit design failure.

The presence of "bugs" in RTL code, however, is not limited to the circuit design, as test benches also can include defects. These test bench defects may be confined to providing incorrect stimulus to the simulated circuit design or improper response checking, but, in some cases, the test bench "bug" can improperly manage data and inadvertently overconsume physical memory, rendering simulation—at best—resource intensive, or—at worst—incapable of being performed.

Test benches have evolved from static configuration coded in the register-transfer level into programs that dynamically generate the test bench configuration. Many of these test benches are generated with object-oriented programming languages that are transient in nature, for example, with object components, such as classes, being created and destroyed during execution. The test benches, during simulation, can generate handles or memory pointers for these dynamically created class objects, which can be passed around for use during simulation.

One way to destroy class objects is to remove references to the class object, for example, deleting the handles or memory pointers to the class object in memory. The computing system implementing the simulation of the circuit design and test bench typically includes garbage collection functionality, which can identify portions of memory having no references and de-allocating those portions of memory, freeing them up for re-use. When a test bench includes a "bug" that inadvertently retains a handle or memory pointer to a class object, the computing system's garbage collection functionality does not destroy the class object or free up its consumed memory. Current solutions for this problem entail single stepping through the test bench during live simulation and manually reviewing the results, which can be impractical when a data space associated with the simulation gets larger.

SUMMARY

This application discloses a computing system to track handles or memory pointers of class objects during simulation of a test bench as they are created, passed to different processes, and possibly deleted. The computing system can identify portions of source code in a test bench that correspond to class objects, and insert handle tracking code at locations in the test bench associated with the identified portions of source code. During simulation of the test bench, the computing system can execute the handle tracking code, which generates handle occupancies corresponding to memory pointers associated with the class objects. Each of the handle occupancies can include a handle reference or memory pointer for a class object, a location in the test bench corresponding to usage of the memory pointer, and a simulation time associated with the generation of the handle occupancy. The computing system can variously arrange or organize the handle occupancies, synchronize the handle occupancies to portions of source code in the test bench, and display the handle occupancies and the test bench source code in a debug window for review by a verification designer. Embodiments of tracking class object handles will be described below.

DETAILED DESCRIPTION

Illustrative Operating Environment

Figure 1:
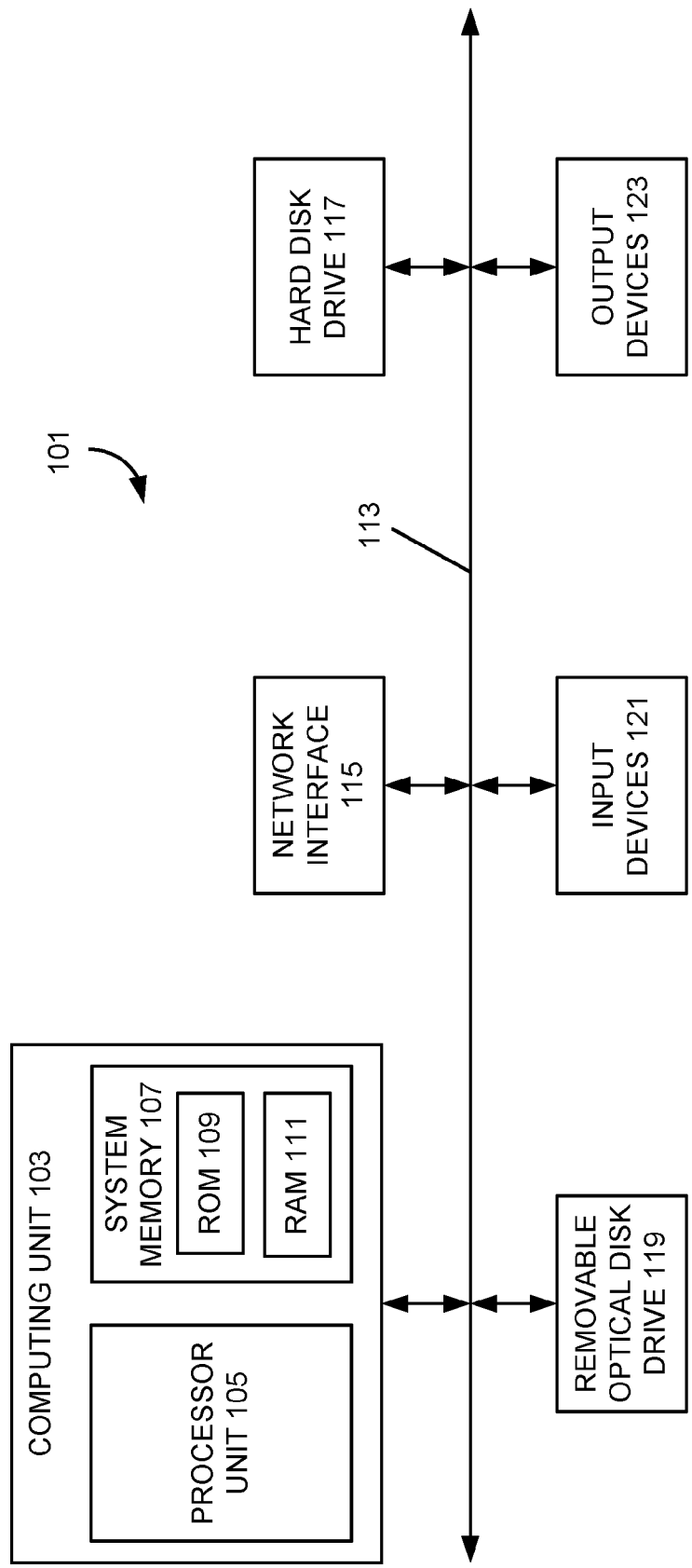
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
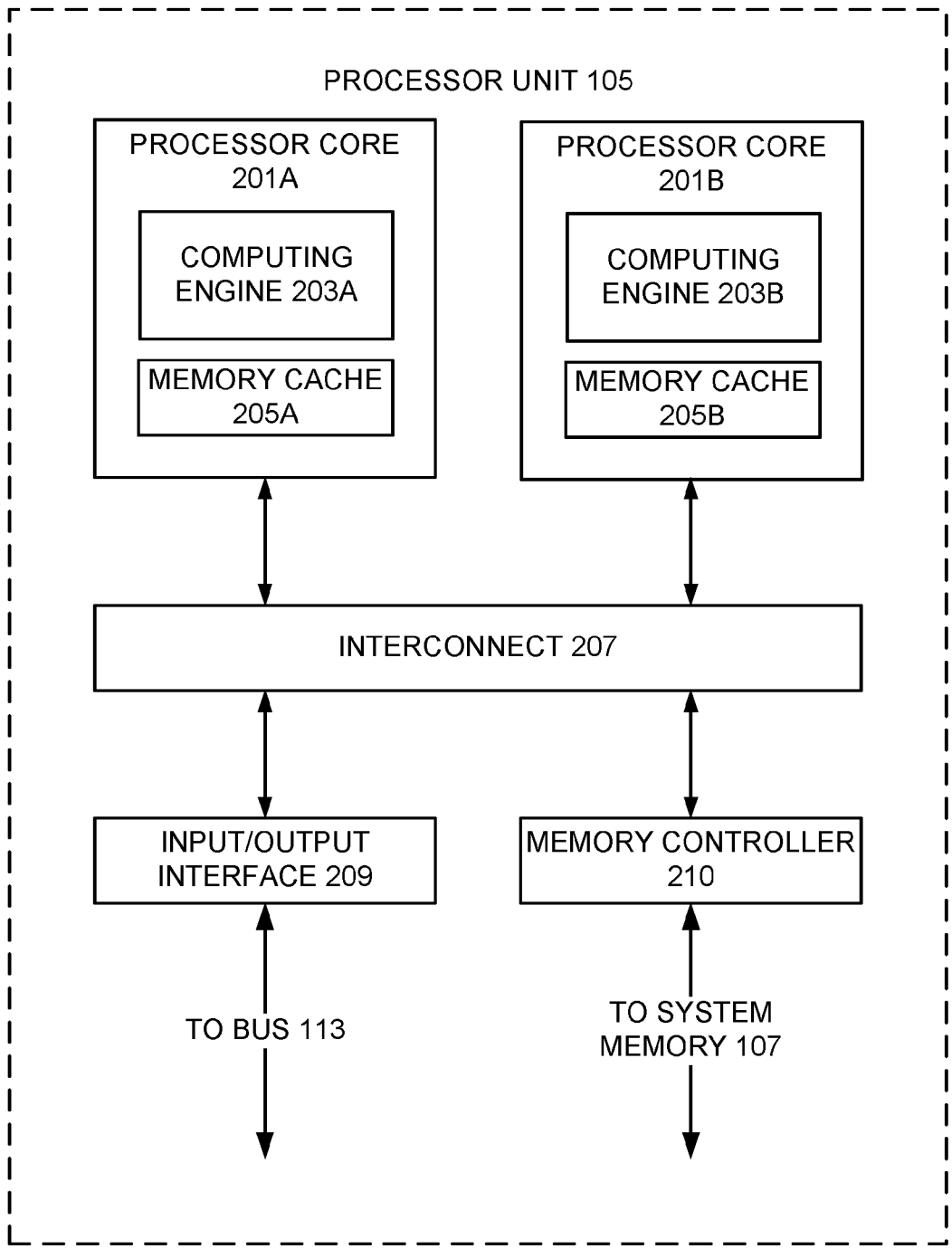

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Tracking Class Object Handles

Figure 3:
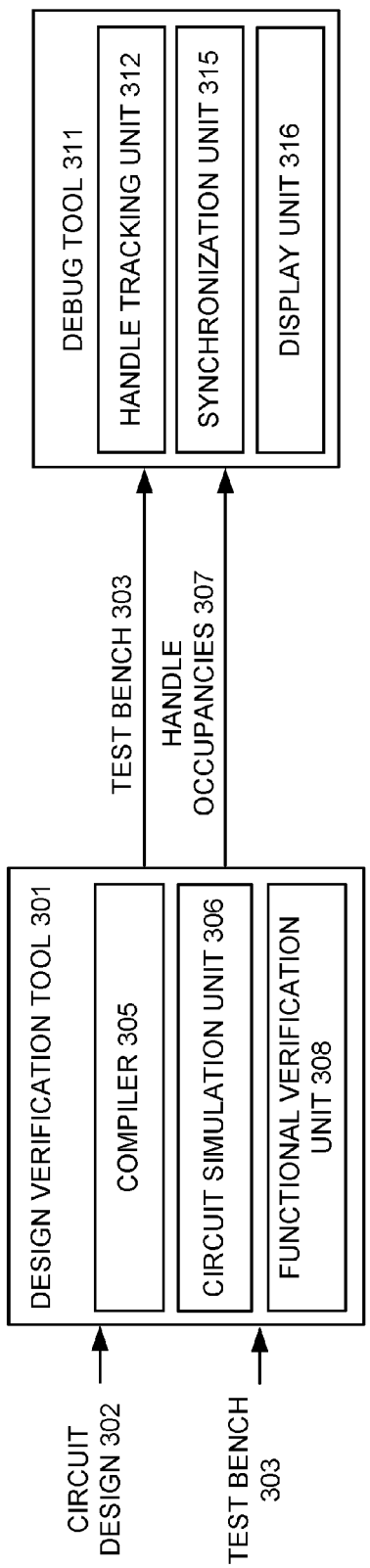
FIG. 3 illustrates an example system including a design verification tool and a debug tool that may be implemented according to various embodiments of the invention.

FIG. 3 illustrates an example system including a design verification tool 301 and a debug tool 311 that may be implemented according to various embodiments of the invention. Although FIG. 3 shows the design verification tool 301 separate from the debug tool 311, in some embodiments, the design verification tool 301 and the debug tool 311 can be integrated into a common tool. Referring to FIG. 3, the design verification tool 301 can receive a circuit design 302, which can describe an electronic device both in terms of an exchange of data signals between components in the electronic device, such as hardware registers, flip-flops, combinational logic, or the like, and in terms of logical operations that can be performed on the data signals in the electronic device. The circuit design 302 can model the electronic device at a register transfer level (RTL), for example, with code in a hardware description language (HDL), such as SystemVerilog, Very high speed integrated circuit Hardware Design Language (VHDL), or the like.

The design verification tool 301 can receive a test bench 303, which can define test stimuli, for example, clock signals, activation signals, power signals, control signals, and data signals that, when grouped, may form test bench transactions capable of prompting operation of the circuit design 302 during simulation. In some embodiments, the test bench 303 can be written in an object-oriented programming language, for example, SystemVerilog or the like, which, when executed during elaboration, can dynamically generate test bench components for simulation of the circuit design 302. A methodology library, for example, a Universal Verification Methodology (UVM) library, an Open Verification Methodology (OVM) library, an Advanced Verification Methodology (AVM) library, a Verification Methodology Manual (VMM) library, or the like, can be utilized as a base for creating the test bench 303 and simulating both the circuit design 302 and the test bench 303. The methodology library can include different library components, for example, portions of code that, when executed during elaboration, can simulate test bench components in a simulation environment.

The design verification tool 301 can include a compiler 305 to compile the test bench 303 and the circuit design 302 into design files having a machine-executable format. The compiler 305 can check the circuit design 302 and the test bench 303 for syntax errors and issue any warnings in response to an identification of the syntax errors or other issues with the format of the circuit design 302 and/or the test bench 303. The compiler 305 can link the design files having the machine-executable format for simulation by a circuit simulation unit 306 in the design verification tool 301.

The compiler 305 also can analyze the test bench 303 to identify portions of its source code associated with class objects. These portions of source code can include commands that, when executed during simulation by the circuit simulation unit 306, can generate of a class object and a handle or memory pointer to a location of the class object in memory, pass a handle between processes, delete a handle or other reference to the class object in memory, or the like.

The compiler 305 can insert handle tracking code at locations in the test bench 303 associated with the identified portions of source code in the test bench 303. As will be described below in greater detail, the handle tracking code, when executed during simulation by the circuit simulation unit 306, can generate handle occupancies corresponding to the handles associated with the identified portions of source code in the test bench. A handle occupancy can include a handle reference configured to identify a handle or memory pointer associated with a class object, a location in the test bench corresponding to usage of a handle for a class object, a time during simulation of the test bench associated with the generation of the handle occupancy, or the like. Embodiments of class object handle tracking will be described below in greater detail.

Figure 4:
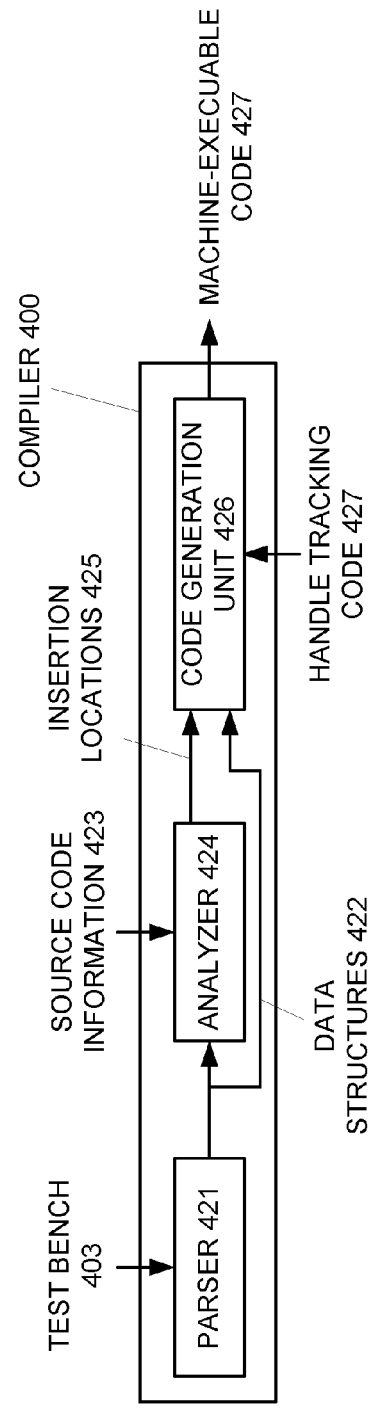
FIG. 4 illustrates an example compiler capable of insertion of handle tracking code, which may be implemented according to various embodiments of the invention.

FIG. 4 illustrates an example compiler 400 capable of insertion of handle tracking code 427, which may be implemented according to various embodiments of the invention. Referring to FIG. 4, the compiler 400 can include a parser 421 to parse a test bench 403 into different parsed data structures 422. The parser 421 can check the test bench 403 for syntax errors and issue any warnings in response to an identification of the syntax errors or other issues with the format of the test bench 403.

The compiler 400 can include an analyzer 424 can receive the data structures 422 from the parser 421 and analyze the data structures 422 to identify portions of source code in the test bench 403 that correspond to class objects. For example, the analyzer 424 can review the data structures 422 to identify source code assignments of class objects or their handles, task enable statement that call a class handle or reference, function call expression with the class handle or reference as an argument or that return the class handle or reference. In some embodiments, the analyzer 424 can receive source code information 423 that includes portions of source code for the analyzer 424 to search for in the data structures 422, instructions on how to search the data structures 422, or the like.

The analyzer 424 can generate insertion locations 425 corresponding to locations of the identified portions of source code in the test bench 403 that correspond to class objects. The analyzer 424, in some embodiments, can modify the data structures 422 to insert markings or placeholders corresponding to the insertion locations 425, and output the modified data structures 422.

The compiler 400 can include a code generation unit 426 can receive the data structures 422 and the insertion locations 425, or optionally a modified version of the data structures 424 that includes markings or placeholders corresponding to the insertion locations 425. The code generation unit 426 can insert handle tracking code 427 into the data structures 422 at locations annunciated by the insertion locations 425. The handle tracking code 427, when executed during simulation, can prompt generation of handle occupancies associated with the identified portions of source code in the test bench 403 that correspond to class objects. The code generation unit 426 can convert the data structures 422 and handle tracking code 427 into machine-executable code 427, which can be linked to machine-executable code corresponding to a circuit design for joint execution during simulation.

Referring back to FIG. 3, the circuit simulation unit 306 can develop a simulation environment to simulate the circuit design 302 and the test bench 303. The circuit simulation unit 306 can elaborate the test bench 303, which can instantiate objects, classes, or the like, in the compiled test bench 303, and prepare the test bench 303 for simulation of the circuit design 302. The circuit simulation unit 306 can record output created by the circuit design 302, such as waveform data, during simulation into a results database. The circuit simulation unit 306 also can record handle occupancies created by the execution of the handle tracking code in the test bench 303 during simulation into the results database. An example simulation environment during simulation will be described below in FIG. 5.

Figure 5:
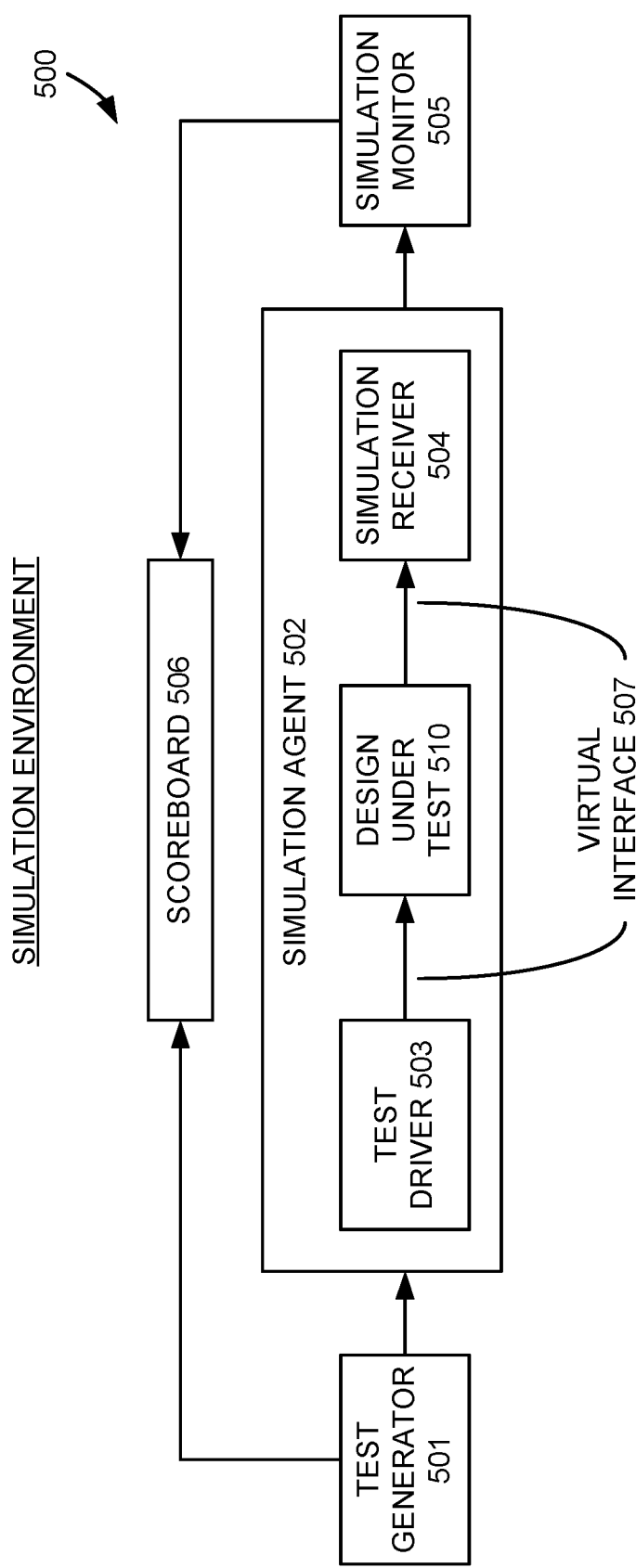
FIG. 5 illustrates an example simulation environment according to various examples of the invention.

FIG. 5 illustrates an example simulation environment 500 according to various examples of the invention. Referring to FIG. 5, the simulation environment 500 shows a high-level representation of a test bench having been elaborated during simulation and a design under test 510, such as the circuit design 302, to be simulated. The simulation environment 500 can include a test generator 501 to generate test stimuli, for example, vectors including clock signals, activation signals, power signals, control signals, data signals, or the like. The test generator 501 can provide the test stimuli to a scoreboard 506 in the simulation environment 500, which can record the test stimuli to be provided to the design under test 510. The test generator 501 also can generate handle information corresponding to memory pointers generated during simulation of the test bench, and provide the handle information to a scoreboard 506 in the simulation environment 500, which can record the handle information.

The simulation environment 500 can include a simulation agent 502 to receive the test stimuli from the test generator 501, provide the test stimuli to the design under test 510, such as the circuit design 302, receive the simulation results generated by the design under test 510 in response to the test stimuli, and provide the simulation results to a simulation monitor 505. The simulation agent 502 can include a test driver 503 to receive the test stimuli from the test generator 501 and provide the test stimuli to the design under test 510, such as the circuit design 302 through at least one virtual interface 507. The simulation agent 502 can include a simulation receiver 504 to receive the simulation results generated by the design under test 510 in response to the test stimuli and provide the simulation results to a simulation monitor 505 through at least one virtual interface 507. The virtual interface 507 can correspond to one or more ports through which the test bench communicates with external object or designs, such as the design under test 510, in the simulation environment 500.

The simulation monitor 505 can compare the simulation results to an expected output of the design under test 510 in response to the test stimuli. In some embodiments, the test generator 501 can provide the test stimuli to the simulation monitor 505, and the simulation monitor 505 can determine the expected output for the design under test 510 based on the test stimuli from the test generator 501. The simulation monitor 505 can record the results of the comparison to the scoreboard 506.

Referring back to FIG. 3, the design verification tool 301 can include a functional verification unit 308 to compare the waveform data with an expected output from the circuit design 302 in response stimulus or transaction from generated by the test bench 303. The functional verification unit 308 can verify the functionality of the circuit design 302 when the waveform data indicates the circuit design 302 operates as expected based on the comparison. When the waveform data indicates the circuit design 302 operates differently than expected based on the comparison, the functional verification unit 308 can determine a "bug" or other defect is present in the circuit design 302 and/or in the test bench 303. In some embodiments, the design verification tool 301 can determine a "bug" or other defect is present in the test bench 303 based on unexpected consumption of computing system resources, such as memory. Although FIG. 3 shows the design verification tool 301 including the functional verification unit 308, in some embodiments, the functional verification unit 308 can be located external to the design verification tool 301.

When the functional verification unit 308 determines a "bug" or other defect is present in the circuit design 302 or in the test bench 303, designer(s) can utilize a debug tool 311 to isolate the "bug" in the circuit design 302 and/or test bench 303. The debug tool 311 can receive the test bench 303, optionally along with other information, such as the circuit design 302, the waveform data, the test bench 303, a test bench simulation log file, handle occupancies 307, or the like, for example, from the design verification tool 301.

The debug tool 311 can include a handle tracking unit 312 to arrange the handle occupancies 307 based on their contents. For example, the handle tracking unit 312 can arrange the handle occupancies based on their generation time. The handle tracking unit 312 may utilize the handle occupancies 307 to generate paths for the different handles identified by handle references in the handle occupancies 307. For example, the handle tracking unit 312 can group the handle occupancies 307 based on their handle references and then arrange the groups by generation time of the handle occupancies 307. These paths can illustrate a chronological path or track of the handles during simulation—from creation to destruction, while also tracking any passing between processes occurring in between.

The debug tool 311 can include a synchronization unit 315 to synchronize the handle occupancies 307 to portions of source code in the test bench 303 the handle occupancies 307 track. For example, when the handle occupancies 307 include a location in the test bench corresponding to usage of a handle for a class object, the synchronization unit 315 can link a portion of source code in the test bench 303 to the handle occupancies 307. In some embodiments, each location in the handle occupancies 307 can include a source file, column number, line number, task or function name associated with the usage of the handle for the class object, or the like.

The debug tool 311 can include a display unit 316 to prompt display or presentation of one or more debug windows capable of population with a representation of the handle occupancies 307, and optionally along with a source code of the test bench 303. Since the synchronization unit 315 linked or synchronized the handle occupancies 307 with portions of source code in the test bench 303, the display unit 316 can prompt display or presentation of handle occupancies 307 and its linked portion of source code in the test bench 303. In some embodiments, the display unit 316 can highlight or otherwise annunciate the linkage between handle occupancies 307 and its linked portion of source code in the test bench 303. The display unit 316 also can receive a selection corresponding to one of the handle occupancies 307 in the debug window, for example, via a user interface, and prompt display or presentation of a portion of source code in the test bench 303 having been linked or synchronized to the selected handle occupancy 307 based on or in response to the selection. Presentation of the handle occupancies 307 alongside the source code of the test bench 303 can allow the designer(s) to review the handle occupancies 307 and the source code of the test bench 303 to isolate the "bug" in the test bench 303.

Figure 6:
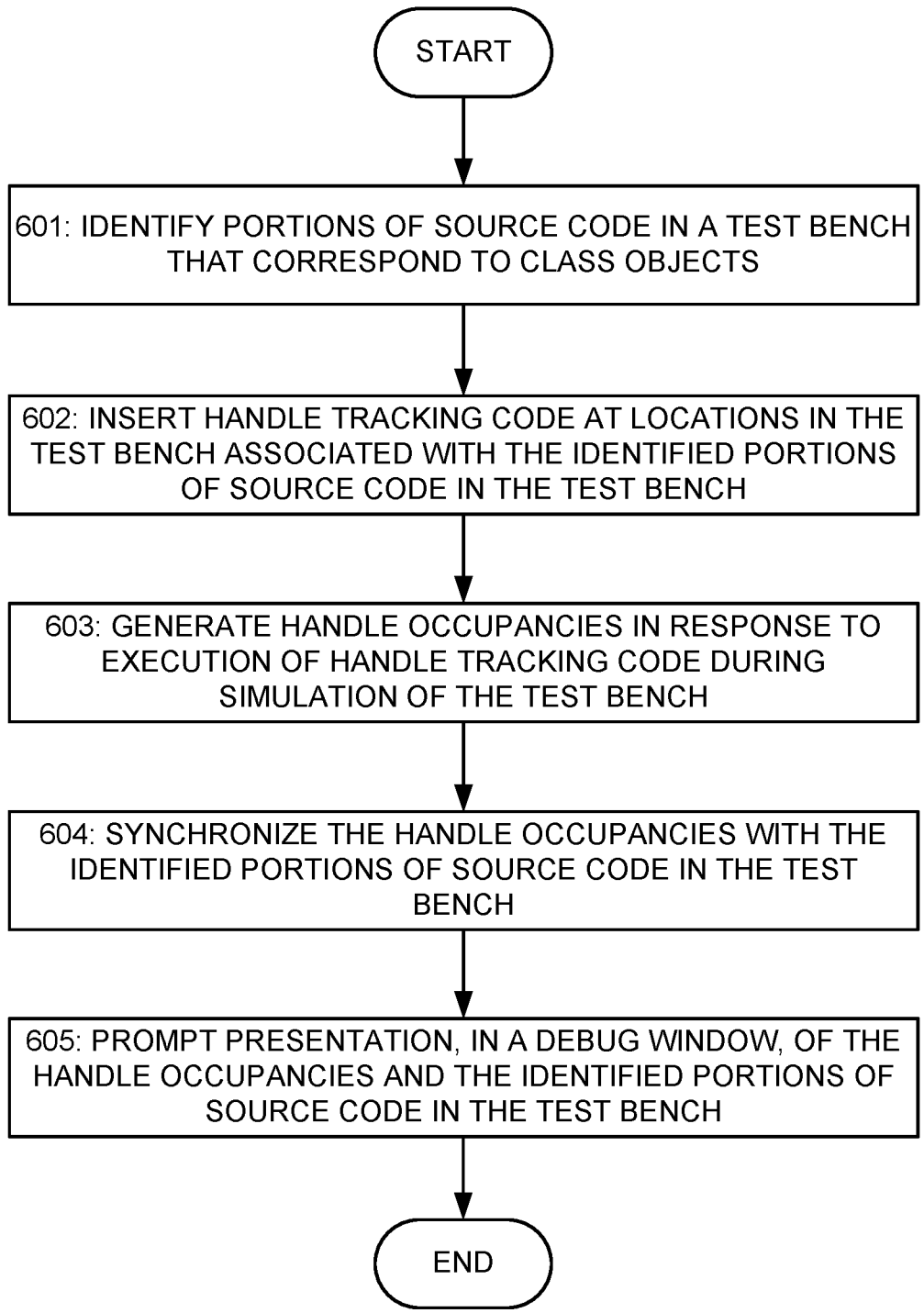
FIG. 6 illustrates a flowchart showing example test bench handle tracking and visualization according to various examples of the invention.

FIG. 6 illustrates a flowchart showing example test bench handle tracking and visualization according to various examples of the invention. Referring to FIG. 6, in a block 601, a computing system implementing a design verification tool can identify portions of source code in a test bench that correspond to class objects. In some embodiments, the computing system can parse the test bench into data structures and analyze the data structures to identify portions of source code in the test bench that correspond to class objects. For example, the computing system can review the data structures to identify source code assignments of class objects or their handles, task enable statement that call a class handle or reference, function call expression with the class handle or reference as an argument or that return the class handle or reference.

The computing system also can generate insertion locations corresponding to locations of the identified portions of source code in the test bench that correspond to class objects. The computing system, in some embodiments, can modify the data structures to insert markings or placeholders corresponding to the insertion locations.

In a block 602, the computing system implementing the design verification tool can insert handle tracking code at locations in the test bench associated with the identified portions of source code in the test bench. The computing system can utilize the insertion locations to determine the locations in the test bench to insert the handle tracking code. The computing system can convert the data structures and the handle tracking code into machine-executable code, which can be linked to machine-executable code corresponding to a circuit design for joint execution during simulation.

In a block 603, the computing system implementing the design verification tool can generate handle occupancies in response to execution of handle tracking code during simulation of the test bench. The handle tracking code, when executed during simulation, can prompt generation of handle occupancies associated with the identified portions of source code in the test bench that correspond to class objects. A handle occupancy can include a handle reference configured to identify a handle or memory pointer associated with a class object, a location in the test bench corresponding to usage of a handle for a class object, a time during simulation of the test bench associated with the generation of the handle occupancy, or the like.

In a block 604, the computing system implementing a debug tool can synchronize the handle occupancies with the identified portions of source code in the test bench. For example, when the handle occupancies include a location in the test bench corresponding to usage of a handle for a class object, the computing system can link a portion of source code in the test bench to the handle occupancies. In some embodiments, each location in the handle occupancies can include a source file, column number, line number, task or function name associated with the usage of the handle for the class object, or the like.

In a block 605, the computing system implementing the debug tool can prompt presentation, in a debug window, of the handle occupancies and the identified portions of source code in the test bench. The debug tool can prompt the presentation of the handle occupancies during a live simulation of the test bench or in a post simulation analysis after execution of the test bench during simulation.

Since the synchronization, performed in the block 604, linked or synchronized the handle occupancies with portions of source code in the test bench, the computing system can prompt display or presentation of handle occupancies and its linked portion of source code in the test bench. In some embodiments, the computing system can highlight or otherwise annunciate the linkage between handle occupancies and its linked portion of source code in the test bench. The computing system also can receive a selection corresponding to one of the handle occupancies in the debug window, for example, via a user interface, and prompt display or presentation of a portion of source code in the test bench having been linked or synchronized to the selected handle occupancy based on or in response to the selection. Presentation of the handle occupancies alongside the source code of the test bench can allow the designer(s) to review the handle occupancies and the source code of the test bench to isolate the "bug" in the test bench.

Figure 7:
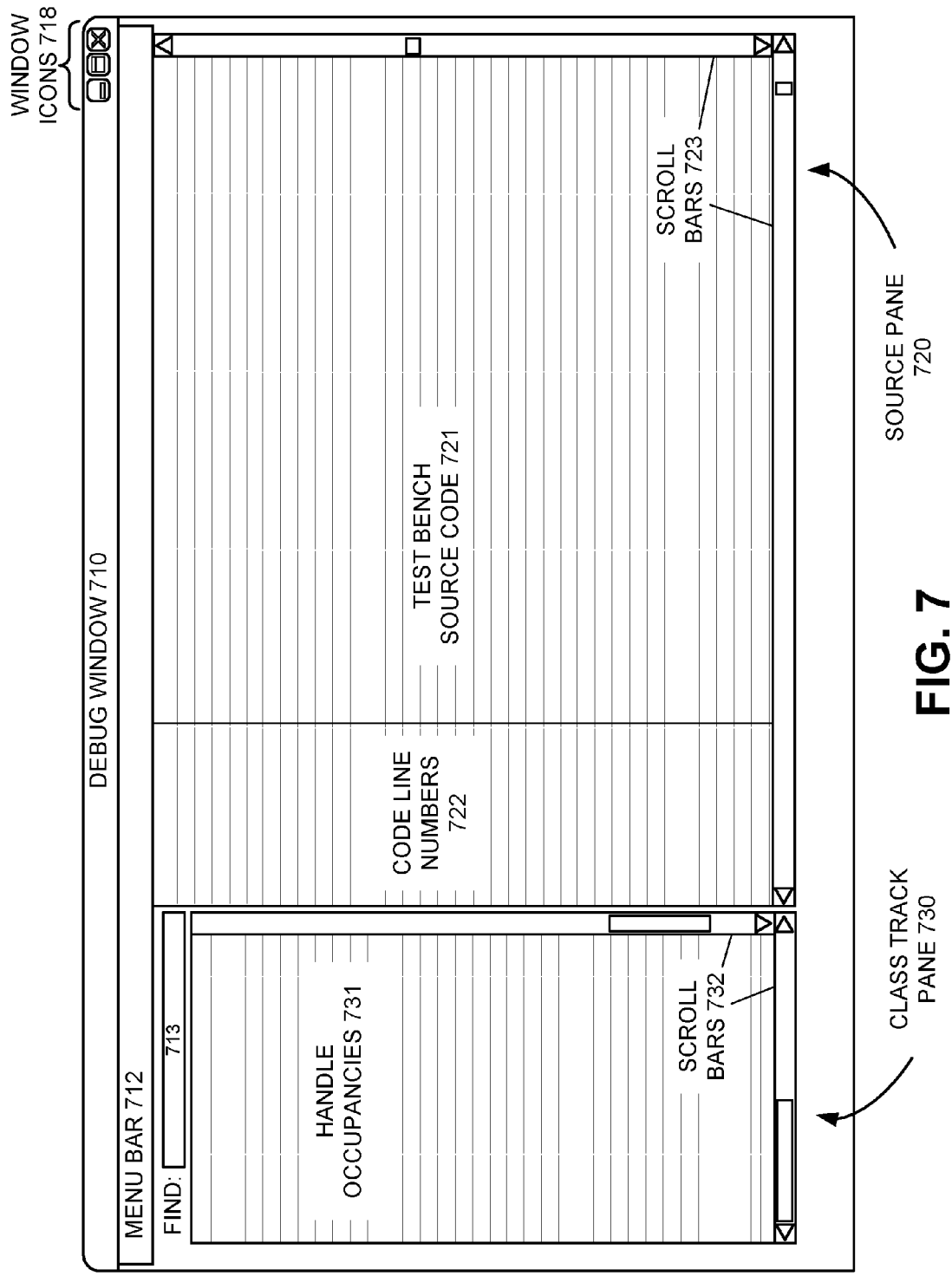
FIG. 7 illustrates an example debug window to display the handle occupancies according to various embodiments of the invention.

FIG. 7 illustrates an example debug window 710 to display handle occupancies 731 according to various embodiments of the invention. Referring to FIG. 7, the debug window 710 can include a source pane 720 and a class track pane 730. The source pane 720 can include a test bench source code 721, for example, sequenced by code line numbers 722. In some embodiments, the source pane 720 can be arranged in rows, with each row corresponding to different line in the test bench source code 721. The source pane 720 can include scroll bars 723, that, when selected or moved, for example, in response to user input, can adjust which portions of the test bench source code 721 are viewable in the source pane 720.

The class track pane 730 can include a list of handle occupancies 731. Each of the handle occupancies 731 in the list can include a handle reference, for example, to identify a class reference or memory pointer corresponding to a section of physical memory, a location corresponding to the usage of the handle reference, and a time during the simulation the handle reference was used. The class track pane 730 can arrange the list of handle occupancies 731 in any number of ways. For example, the class track pane 730 can arrange handle occupancies 731 based on simulation time, location, or handle reference. In some embodiments, the class track pane 730 can arrange the handle occupancies 731 to identify paths through the execution of a test bench, for example, tracking the handle references during simulation. In some embodiments, the class track pane 730 can be arranged in rows, with each row corresponding to different portions and different levels of the handle occupancies 731. The class track pane 730 can include scroll bars 732, which, when selected or moved, for example, in response to user input, can adjust which portion of the handle occupancies 731 is viewable in the class track pane 730.

Since the handle occupancies have been linked or synchronized with portions of the test bench source code 721, the source pane 720 and the class track pane 730 can be interrelated. A selection of a row in one pane can causes corresponding portions of the other panes to automatically scroll into view and optionally be highlighted or otherwise have their presentation altered to annunciate their presence in the corresponding panes. For example, a selection of at least one of the handle occupancies 731 in the class track pane 730 can cause a related portion of the test bench source code 721 in the source pane 720 to automatically scroll into view and optionally be highlighted or otherwise have their presentation altered to annunciate their presence.

The debug window 710 can include a menu bar 712 having various mechanisms to selectively sort, filter, organize, populate, or the like, the source pane 720 and the class track pane 730. The debug window 710 also can include a find text box 713 to receive user input corresponding to a search of the source pane 720 and the class track pane 730. The debug window 710 also can include window icons 718, which can control sizing of the test bench source display window 710, such as enlarging, shrinking, minimizing, or the like, and closing of the test bench source display window 710.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a computing system, locations in source code of a test bench that correspond to memory pointers for class objects capable of generation during simulation of the test bench and a circuit design;
   inserting, by the computing system, handle tracking code at the locations in the test bench that were identified as corresponding to the memory pointers for the class objects;
   generating, by the computing system, handle occupancies corresponding to the memory pointers for the class objects in response to execution of the handle tracking code during the simulation of the test bench and the circuit design;
   synchronizing, by the computing system, the handle occupancies with portions of source code in the test bench based on the identified locations; and
   prompting, by the computing system, presentation in a debug window of the handle occupancies, and presentation of the portions of source code in the test bench associated with the handle occupancies based on the synchronization.

2. The method of claim 1, wherein each of the handle occupancies includes at least one of a handle reference configured to identify a memory pointer for a class object, a location in the test bench corresponding to usage of the memory pointer for the class object, or a time during simulation of the test bench associated with the generation of the handle occupancy.

3. The method of claim 1, further comprising receiving, by the computing system, a selection corresponding to one of the handle occupancies in the debug window, wherein prompting presentation of the portions of source code in the test bench associated with the handle occupancies is performed in response to the selection.

4. The method of claim 1, further comprising compiling, by the computing system, the test bench into machine-executable code, wherein inserting the handle tracking code at locations of the test bench is performed during the compilation of the test bench into the machine-executable code.

5. The method of claim 1, further comprising:
   simulating, by the computing system, the test bench and the circuit design at least in part by executing the machine-executable code; and
   recording, by the computing system in a results database, waveform data generated by the simulated circuit design and the handle occupancies generated in response to execution of handle tracking code.

6. A system comprising:
   a memory device configured to store machine-readable instructions; and a computing system including one or more processing devices, in response to executing the machine-readable instructions, configured to:
  identify locations in source code of a test bench that correspond to memory pointers for class objects capable of generation during simulation of the test bench and a circuit design;
  insert handle tracking code at the locations in the test bench that were identified as corresponding to the memory pointers for the class objects;
  generate handle occupancies corresponding to the memory pointers for the class objects in response to execution of the handle tracking code during the simulation of the test bench and the circuit design;
  synchronize the handle occupancies with portions of source code in the test bench based on the identified locations; and
  prompt presentation of the portions of source code in the test bench associated with the handle occupancies based on the synchronization.

7. The system of claim 6, wherein each of the handle occupancies includes at least one of a handle reference configured to identify a memory pointer for a class object, a location in the test bench corresponding to usage of the memory pointer for the class object, or a time during simulation of the test bench associated with the generation of the handle occupancy.

8. The system of claim 6, wherein the one or more processing devices, in response to executing the machine-readable instructions, are configured to:
  receive a selection corresponding to one of the handle occupancies in the debug window; and
  prompt presentation of the portions of source code in the test bench associated with the selected handle occupancy.

9. The system of claim 6, wherein the one or more processing devices, in response to executing the machine-readable instructions, are configured to compile the test bench into machine-executable code, wherein the insertion of the handle tracking code at locations of the test bench is performed during the compilation of the test bench into the machine-executable code.

10. The system of claim 9, wherein the one or more processing devices, in response to executing the machine-readable instructions, are configured to:
  simulate the test bench and the circuit design at least in part by executing the machine-executable code; and
  record, in a results database, waveform data generated by the simulated circuit design and the handle occupancies generated in response to execution of handle tracking code.

11. An apparatus comprising at least one computer-readable memory device storing instructions configured to cause one or more processing devices to perform operations comprising:
  identifying locations in source code of a test bench that correspond to memory pointers for class objects capable of generation during simulation of the test bench and a circuit design;
  inserting handle tracking code at the locations in the test bench that were identified as corresponding to the memory pointers for the class objects;
  generating handle occupancies corresponding to the memory pointers for the class objects in response to execution of the handle tracking code during the simulation of the test bench and the circuit design;
  synchronizing the handle occupancies with portions of source code in the test bench based on the identified locations; and
  prompting presentation in a debug window of the handle occupancies, and presentation of the portions of source code in the test bench associated with the handle occupancies based on the synchronization.

12. The apparatus of claim 11, wherein each of the handle occupancies includes at least one of a handle reference configured to identify a memory pointer for a class object, a location in the test bench corresponding to usage of the memory pointer for the class object, or a time during simulation of the test bench associated with the generation of the handle occupancy.

13. The apparatus of claim 11, wherein the instruction are configured to cause one or more processing devices to perform operations further comprising receiving a selection corresponding to one of the handle occupancies in the debug window, wherein prompting presentation of the portions of source code in the test bench associated with the handle occupancies is performed in response to the selection.

14. The apparatus of claim 11, wherein the instruction are configured to cause one or more processing devices to perform operations further comprising compiling the test bench into machine-executable code, wherein inserting the handle tracking code at locations of the test bench is performed during the compilation of the test bench into the machine-executable code.

15. The apparatus of claim 14, wherein the instruction are configured to cause one or more processing devices to perform operations further comprising:
  simulating the test bench and the circuit design at least in part by executing the machine-executable code; and
  recording, in a results database, waveform data generated by the simulated circuit design and the handle occupancies generated in response to execution of handle tracking code.

* * * * *